(12) United States Patent
Kulkarni et al.

(10) Patent No.: US 7,664,980 B2
(45) Date of Patent: Feb. 16, 2010

(54) METHOD AND SYSTEM FOR AUTOMATIC ATTEMPTED RECOVERY OF EQUIPMENT FROM TRANSIENT FAULTS

(75) Inventors: Milind Kulkarni, Richardson, TX (US); Rashmi V. Varma, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 401 days.

(21) Appl. No.: 11/682,634

(22) Filed: Mar. 6, 2007

(65) Prior Publication Data

US 2008/0024949 A1 Jan. 31, 2008

Related U.S. Application Data

(60) Provisional application No. 60/820,669, filed on Jul. 28, 2006.

(51) Int. Cl.
*G06F 11/00* (2006.01)

(52) U.S. Cl. .................. 714/4; 709/223; 709/224

(58) Field of Classification Search .................. 714/4
See application file for complete search history.

(56) References Cited

U.S. PATENT DOCUMENTS 6,545,981 B1 * 4/2003 Garcia et al. .............. 370/242
7,373,542 B2 * 5/2008 Bragulla et al. ............... 714/4
2003/0023749 A1 * 1/2003 Lee et al. .................. 709/240
2003/0229844 A1 * 12/2003 Bansal et al. .............. 714/821
2004/0255202 A1 * 12/2004 Wong et al. .................. 714/43
2006/0117212 A1 * 6/2006 Meyer et al. .................. 714/4
2007/0005248 A1 * 1/2007 Averill et al. .............. 701/301

* cited by examiner

*Primary Examiner*—Emerson C Puente
(74) *Attorney, Agent, or Firm*—Baker Botts L.L.P.

(57) ABSTRACT

A method for automatically attempting to recover equipment from a transient fault includes detecting a fault associated with the equipment in a node in a communications network, determining whether the fault associated with the equipment is transient, if the fault is transient automatically attempting to recover the equipment from the transient fault without user intervention, if the recovery attempt is successful monitoring the equipment for a pre-determined period of time to determine if the fault recurs, and if the fault recurs automatically re-attempting to recover the equipment from the fault until the fault does not recur in the pre-determined period of time or until a pre-determined number of attempts to recover the equipment have been performed.

36 Claims, 3 Drawing Sheets

METHOD AND SYSTEM FOR AUTOMATIC ATTEMPTED RECOVERY OF EQUIPMENT FROM TRANSIENT FAULTS

RELATED APPLICATIONS

This application claims the benefit under 35 U.S.C. § 119(e) of U.S. Provisional Application No. 60/820,669 filed Jul. 28, 2006, entitled "Method and System for Attempted Recovery of Equipment from Transient Faults".

TECHNICAL FIELD

The present invention relates generally to networks and, more particularly, to a method and system for automatically attempting to recover equipment from transient faults.

BACKGROUND

Equipment, such as network nodes, in communications networks may be subject to periodic faults that interfere with the operation of the equipment. These faults may be permanent faults with the equipment that require that the equipment be repaired and/or replaced. Other faults may be associated with transient conditions in the network and may not be reflective of a defect in the equipment. In either case, the equipment is typically replaced and sent for repair when it reports a fault condition. However, if the fault condition is transient, such replacement may be unnecessary and result in wasted time and resources.

SUMMARY

In accordance with the present invention, disadvantages and problems associated with previous techniques for automatically recovering equipment from a transient fault may be reduced or eliminated.

In accordance with some embodiments, a method is provided for automatically attempting to recover equipment from a transient fault. The method detects a fault associated with the equipment in a node in a communications network and determines whether the fault associated with the equipment is transient. If the fault is transient, the method automatically attempts to recover the equipment from the transient fault without user intervention. If the recovery attempt is successful, the method monitors the equipment for a pre-determined period of time to determine if the fault recurs. If the fault recurs, the method automatically re-attempts to recover the equipment from the fault until the fault does not recur in the pre-determined period of time or until a pre-determined number of attempts to recover the equipment have been performed.

In one embodiment, the method also reprovisions the equipment if the recovery attempt is successful. In another embodiment, the method also determines whether the recovery attempt is successful by sending a read/write command to the equipment and by receiving an acknowledgment that the read/write command was successful. In yet another embodiment, the method also notifies the user of the recovery attempt.

The use of certain embodiments of the invention may provide one or more technical advantages. A technical advantage of one embodiment may be that network equipment is recovered from a transient fault without user intervention. If a transient fault occurs on a network equipment, the user of that equipment may be saved the time and cost of sending a technician to reseat (or otherwise reset) and/or replace the faulting unit (since in many cases the attempted recovery process will result in recovery from the fault and continued proper operation of the equipment). Another technical advantage of one embodiment may be that the user is notified that a recovery is in progress.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
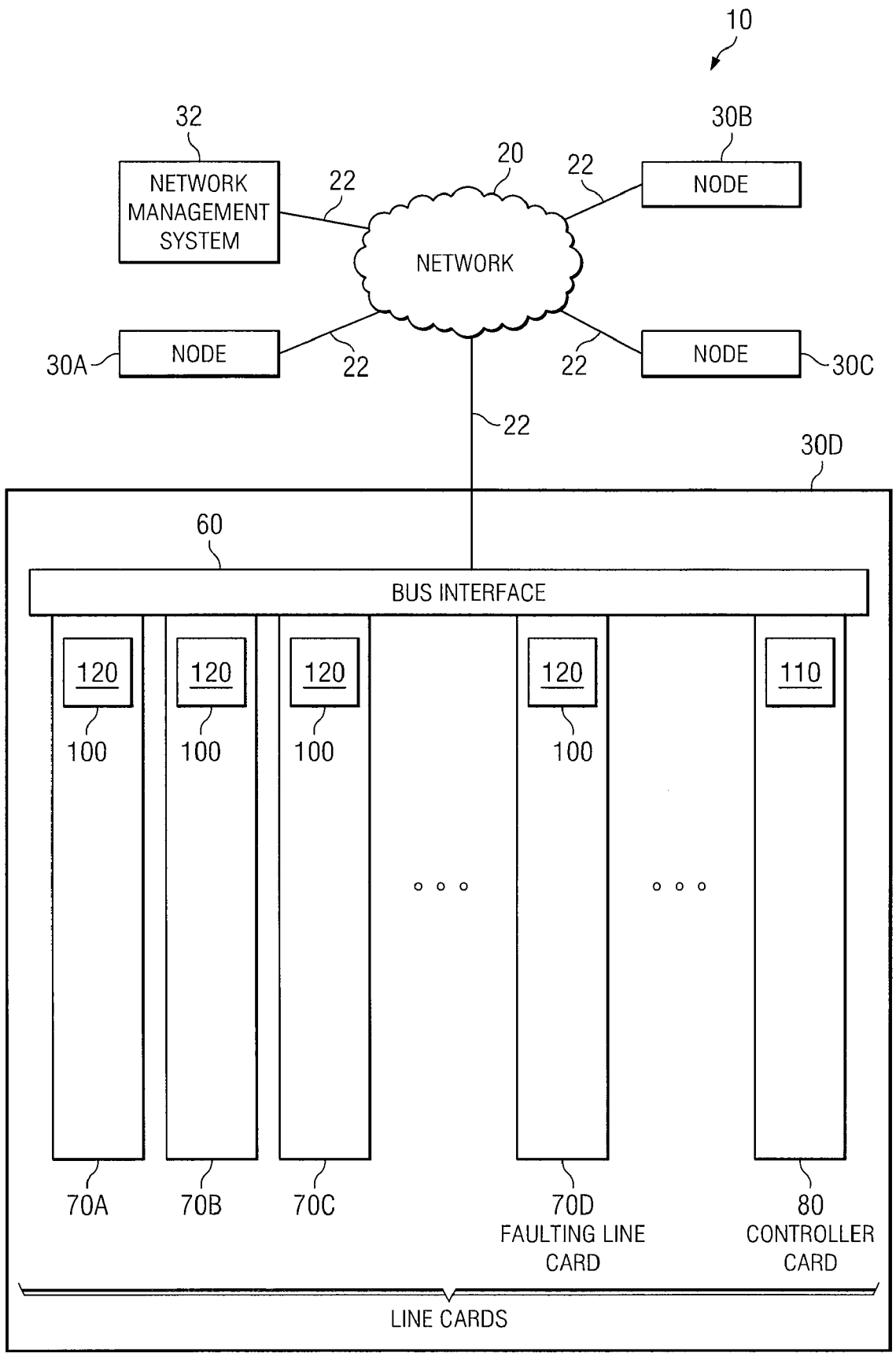
FIG. 1 is a block diagram of one embodiment of a network system for automatically attempting to recover equipment from a transient fault.

FIG. 1 is a block diagram illustrating a network system 10 for automatically attempting to recover equipment from a transient fault according to one embodiment. During this auto-recovery process, a fault is detected in the equipment and it is determined whether the fault may be transient. In response to determining that the fault may be transient, automatic attempts to recover the equipment are made. The equipment is monitored to determine whether the transient fault recurs.

"Equipment" refers to any suitable type and combination of components of network system 10 operable to perform the functions of the equipment. Equipment may include hardware, software, or any suitable combination thereof. For example, equipment may include logic, interface, memory, and other system components. In particular embodiments, the equipment comprises components operable to communicate information to and from a communication network 20. "Logic" refers to hardware, software, other logic, or any suitable combination of the preceding that may be used to provide information or instructions. Certain logic may manage the operation of equipment, and may comprise, for example, a processor. "Processor" refers to any suitable equipment operable to execute instructions and manipulate data to perform operations.

Communication network 20 allows equipment in network system 10 to communicate information with other networks or other equipment in network system 10. Communication network 20 may comprise all or a portion of public switched telephone network (PSTN), a public or private data network, a local area network (LAN), a metropolitan area network (MAN), a wide area network (WAN), a global computer network such as the Internet, a wireline or wireless network, a local, regional, or global communication network, an enterprise intranet, other suitable communication link, or any combination of the preceding. Information may refer to voice, data, text, audio, video, multimedia, control, signaling, other information, or any combination of the preceding. Communication links 22 refer to any suitable connection for communicating information between equipment in network system 10 and to other networks. Examples of communication links 22 include a wire, an optical fiber, or a wireless connection.

A node 30 refers to network equipment that is a point of connection to communications network 20. Node 30 may comprise any suitable equipment for performing the functions of communicating information to and from communications network 20. For example, node 30 may include a card shelf having a bus interface 60 that couples to cards 70 and 80. "Card" may refer in particular embodiments to a modular electronic circuit on a printed circuit board. Bus interface 60 refers to electronic equipment over which information flows between cards coupled to bus interface 60. In some cases, this information is distributed to all cards 70 and 80 coupled to bus interface 60, but is only read by the cards 70 and 80 that the information is addressed to.

Types of cards include line cards 70 and controller cards 80. Line cards 70 are coupled to and communicate information to and from communications network 20. Controller cards 80 control the operation and configuration of line cards 70. Each line card 70 and each controller card 80 may include processors, memory, and/or other suitable equipment for performing card functions.

According to the illustrated embodiment, network system 10 includes a communications network 20 coupled by communication links 22 to nodes 30. Nodes 30 include a network management system (NMS) 32 for managing nodes 30a-d. NMS 32 refers to software, hardware, or any combination thereof that is operable to manage operations on nodes 30, to receive input from a user, and to communicate output to the user. A user may be any suitable operator of network system 10. For example, a user may be a technician or other system operator monitoring the auto-recovery process. In one embodiment, user may input pre-determined values used in the auto-recovery process through NMS 32. User may also receive notifications and other output from the auto-recovery process through NMS 32. NMS 32 may communicate output to a user in any suitable form. In one example, NMS 32 may display output on a screen. In another example, NMS 32 provides output in printed form.

A particular node 30d is shown in greater detail as an example and is illustrated including equipment that is exhibiting a transient fault. In the illustrated example, line card 70d is experiencing a fault. In some examples, other line cards 70 and/or other equipment in network system 10 may exhibit faults simultaneously. Faulting node 30d includes a bus interface 60 coupled to functioning line cards 70a-70c, faulting line card 70d, and controller card 80. Node 30 may include any suitable number of line cards 70 and controller cards 80. In the illustrated example, controller card 80 issues commands to line cards 70 to control operations on line cards 70. In response, line cards 70 obey commands issued by controller card 80.

Each line card 70 includes an interface chip 100 for sending and receiving information over bus interface 60. One example of interface chip 100 is a field programmable gate array (FPGA) chip. Controller card 80 includes a memory space address 120 mapped to a common memory space address 120 allocated to interface chip 100 in each line card 70. In some embodiments, the common memory space addresses 120 on line cards 70a-70d store preprogrammed values. The preprogrammed values at common memory space address 120 may change when a power glitch occurs.

Nodes 30, particularly the line cards 70 of nodes 30, may be subject to equipment faults. A fault refers to any failure in the operations of equipment in network system 10. Equipment faults may include, for example, failing to complete an operation, incorrect completion of an operation, complete failure to operate, or other types of failures. In one case, a fault is a failure of a read/write operation. Faults may be due to any number of causes, such as a power glitch in the equipment. A power glitch refers to any fluctuation in the power to the equipment. In some cases, the cause of a fault may be unknown.

Faults may be categorized as transient or permanent based on the nature and/or cause of the failure. Transient faults are faults associated with transient conditions in network system 10 and may not be associated with a defect in the equipment. Permanent faults are faults that require that the equipment be repaired and/or replaced. Faults that are initially categorized as transient faults may be re-categorized as permanent faults if attempts to recover the equipment fail to return the equipment to a level of operation equivalent or better than prior to the occurrence of the fault.

An attempt to recover faulting equipment may include performing one or more suitable actions to try to stop the equipment from exhibiting faults for a pre-determined period of time. Attempts to recover may involve reseating or otherwise resetting the faulting equipment. Reseating refers to removing and replacing power to the equipment so that the equipment shuts down completely and restarts all functions. In many cases, reseating involves physically removing the equipment from access to power (for example, removing a card from a card shelf of node 30) and then replacing the access to power. In these cases, a technician or other user may go to the site of the equipment to reseat the equipment. Resetting refers to performing actions to reload the operating system. In some cases, equipment may be reset remotely and/or automatically. In one embodiment, an attempt to recover includes resetting the faulting equipment, waiting for the faulting equipment to come back up from the reset, determining whether the recovery was immediately successful, and reprovisioning the faulting equipment. Reprovisioning refers to performing any suitable operations to establish communications between equipment and communications network 20.

Attempts to recover equipment may be categorized as successful or unsuccessful. A successful attempt refers to an attempt that stops the faulting equipment from exhibiting faults for a pre-determined period of time. In some cases, a successful attempt stops faults from occurring indefinitely. In other cases, a user defines a pre-determined period of time that the equipment must function without faulting for the attempt to be successful. An unsuccessful attempt refers to an attempt that results in the fault recurring during the pre-determined period of time.

In one embodiment of the auto-recovery process, controller card 80 detects a transient fault in faulting line card 70d. Controller card 80 categorizes the fault as transient or permanent based on the nature and/or cause of the fault. If the fault is categorized as transient, controller card 80 notifies the user that a fault has occurred and of the auto-recovery activity through NMS 32. Controller card 80 attempts to recover the faulting line card 70d from the transient fault. If this attempt is immediately successful, controller card 80 monitors faulting line card 70d for a pre-determined time period. If no further faults are detected during this pre-determined time period, controller card 80 clears the user notification and notifies the user that the auto-recovery activity is complete. If a fault is again detected during this pre-determined time period, then attempts to recover the faulting line card 70d are repeated until the fault does not recur in the pre-determined period of time or until a pre-determined number of attempts to recover the equipment have been performed. If these repeated recovery attempts fail, controller card 80 terminates the auto-recovery process and clears the user notification.

The auto-recovery process recovers faulting equipment remotely and without user intervention. Thus, a user may save the time and the cost of sending a technician to the site of the equipment to reseat the equipment. The auto-recovery process may also categorize a fault as transient or permanent. The user may avoid attempting to reset equipment with a permanent fault (and just replace it). The user may also avoid replacing equipment with a transient fault when the equipment can be automatically recovered. The auto-recovery process also automatically notifies one or more users that the auto-recovery process is in progress.

Modifications, additions, or omissions may be made to network system 10 without departing from the scope of the invention. The components of network system 10 may be integrated or separated according to particular needs. Moreover, the operations of network system 10 may be performed by more, fewer, or other pieces of equipment. Additionally, operations of to network system 10 may be performed using any suitable logic comprising software, hardware, other logic, or any suitable combination of the preceding. As used in this document, "each" refers to each member of a set or each member of a subset of a set. As used in this document, the terms "automatic" and "automatically" or "without user intervention" refer to processing that is substantially performed by at least part of network system 10.

Figure 2:
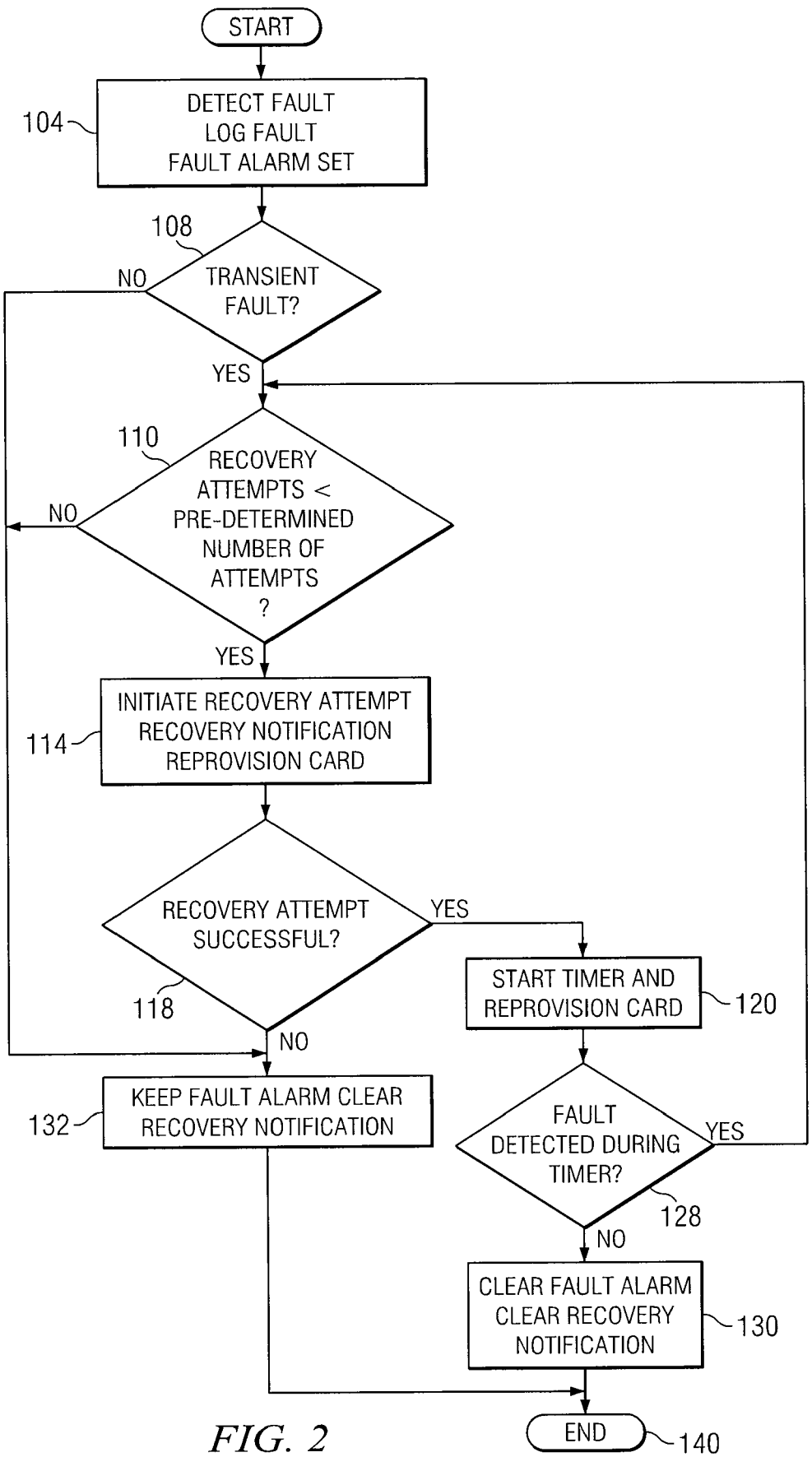
FIG. 2 is a flowchart demonstrating one embodiment of a method for automatically attempting to recover a system component from a transient fault.

FIG. 2 is a flowchart demonstrating one embodiment of a method for automatically attempting to recover equipment from a transient fault. The method begins at step 104 where a controller card or other suitable controlling equipment detects a fault on a faulting line card or other faulting operating equipment. The fault is logged in memory for further investigation of the fault and faulting equipment. In addition, a fault alarm is triggered at an NMS.

The controller card may detect the fault on a faulting line card using any suitable method. For example, the controller card may test an operation on the equipment and/or may monitor the equipment for faults. In another example, equipment such as a faulting line card may send the controller card notice of the fault. In yet other examples, a user monitoring processes at a node using an NMS may notify the controller card that the fault occurred.

At step 108, the controller card categorizes the fault as transient or permanent based on the nature and/or cause of the equipment fault to determine whether the detected fault is a transient fault. For example, ff the fault causes a failure of a read/write operation to a hardware register on the faulting line card, the controller card categorizes the fault as a transient fault. As another example, the controller card may categorize faults caused by a power glitch or temperature fluctuations in the faulting line card also as transient faults. If the fault is a hardware failure, the controller card may categorize the fault as permanent. Faults that are initially categorized as transient faults may be later re-categorized as permanent faults if the auto-recovery process fails to correct the faults.

If the controller card categorizes the fault as permanent at step 108, the controller card keeps the fault alarm and terminates the method at step 132. If the fault is categorized as transient, the method continues to step 110.

At step 110, the auto-recovery process tests whether the number of recovery attempts is more than a pre-determined number of attempts. When a new transient fault has been detected at step 108, then the number of attempts is zero. In some cases, the pre-determined number of attempts is based on the number of attempts within a certain period of time. If the number of recovery attempts is more than the pre-determined number of attempts, the fault alarm is kept and the auto-recovery process terminates at step 132. If the number of recovery attempts is less than the pre-determined number of attempts, the method continues to step 114.

In one embodiment, user may input the pre-determined number of attempts to recover the equipment through an NMS before the initiation of the auto-recovery process or during the auto-recovery process. Typical values for a pre-determined number of attempts in a pre-determined period of time range from sixteen-eighteen attempts in a period of three minutes. Any suitable number of attempts in any suitable period of time may be used.

At step 114, a controller card initiates an automatic attempt to recover the faulting line card and notifies an NMS that the auto-recovery process is in progress. In one embodiment, the automatic attempt includes resetting a faulting line card, waiting for the faulting line card to come back up from the reset, determining whether the recovery was immediately successful, reprovisioning the faulting line card, and any other operations performed on the faulting line card as discussed below.

At step 118, a controller card tests the faulting line card or otherwise determines whether the recovery was immediately successful. For example, controller card 80 may send one or more read/write commands to the faulting line card and wait for acknowledgements of the receipts of the commands. If the controller card does not receive any acknowledgements, the recovery is determined to be unsuccessful. If the controller card receives at least one acknowledgement, the recovery is determined to be initially successful.

If the recovery attempt is unsuccessful, the controller card keeps the fault alarm, clears the notification that the auto-recovery process is in progress, and terminates the method at step 132. If the recovery attempt is initially successful, the controller card starts a timer and reprovisions the faulting line card at step 120. Reprovisioning may include performing operations to recover communications with the network.

The controller card monitors the faulting line card for a pre-determined period of time (according to the timer) to determine whether the fault recurs. At step 128, the controller card determines whether the fault was detected in the faulting line card before the timer expires (during the pre-determined period of time). In one embodiment, user may input the pre-determined period of time through an NMS before the initiation of the auto-recovery process or during the auto-recovery process. In an example embodiment, the pre-determined period of time may be approximately sixty seconds. Any suitable time period may be used. If a fault is detected in the faulting line card during the this time, the method returns to step 110. If a fault is not detected, the controller card determines that the auto-recovery was successful and thus clears the fault alarm and notification that the auto-recovery process is in progress, and terminates the method at step 140.

Modifications, additions, or omissions may be made to the method without departing from the scope of the invention. The method may include more, fewer, or other steps. Additionally, steps may be performed in any suitable order without departing from the scope of the invention.

Figure 3:
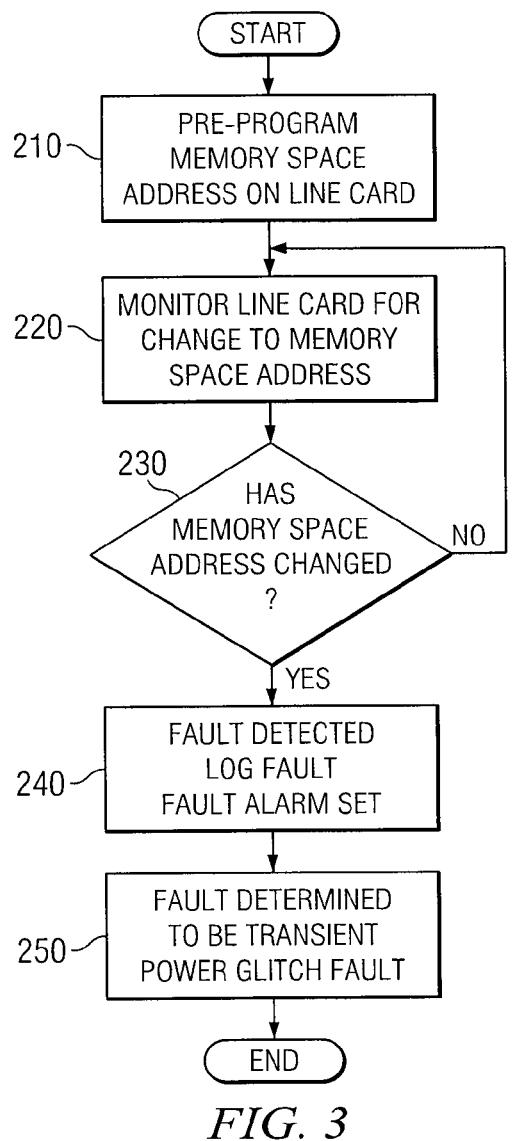
FIG. 3 is a flowchart demonstrating one embodiment of a method for determining a transient fault caused by a power glitch.

FIG. 3 is a flowchart demonstrating one embodiment of a method for determining a transient fault caused by a power glitch. For example, such a method may be performed in particular embodiments in conjunction with step 108 of the method of FIG. 2 (along with other suitable techniques for identifying a transient fault, if applicable).

In some embodiments of the method, a power glitch in a faulting line card causes an interface chip to change the value stored in a common memory space address from its preprogrammed value. The controller card periodically monitors the line cards for changes to the common memory space addresses. If any of the common memory space addresses change, the controller card may determine that a transient fault caused by a power glitch exists.

In the illustrated embodiment, the method begins at step 210 where the common memory space address on the faulting line card stores a preprogrammed value. When a power glitch occurs, the preprogrammed value changes.

At step 220, the controller card monitors common memory space addresses on the line cards for changes from preprogrammed values. A controller card may, for example, periodically read common memory space addresses on line cards. In some embodiments, a controller card may compare the values read to mapped values on memory space address of the controller card to determine whether a change has occurred.

At step 230, the controller card determines whether common memory space addresses on line cards change. If none of the common memory space addresses changed, the method returns to step 220 to continue monitoring the line cards. If a common memory space address on a faulting line card changes, the method goes to step 240.

At step 240, controller card categorizes the fault as a transient fault since the fault is likely caused by a power glitch. At this point, the controller card may perform a suitable auto-recovery process.

Modifications, additions, or omissions may be made to the method without departing from the scope of the invention. The method may include more, fewer, or other steps. Additionally, steps may be performed in any suitable order without departing from the scope of the invention.

Figure 4:
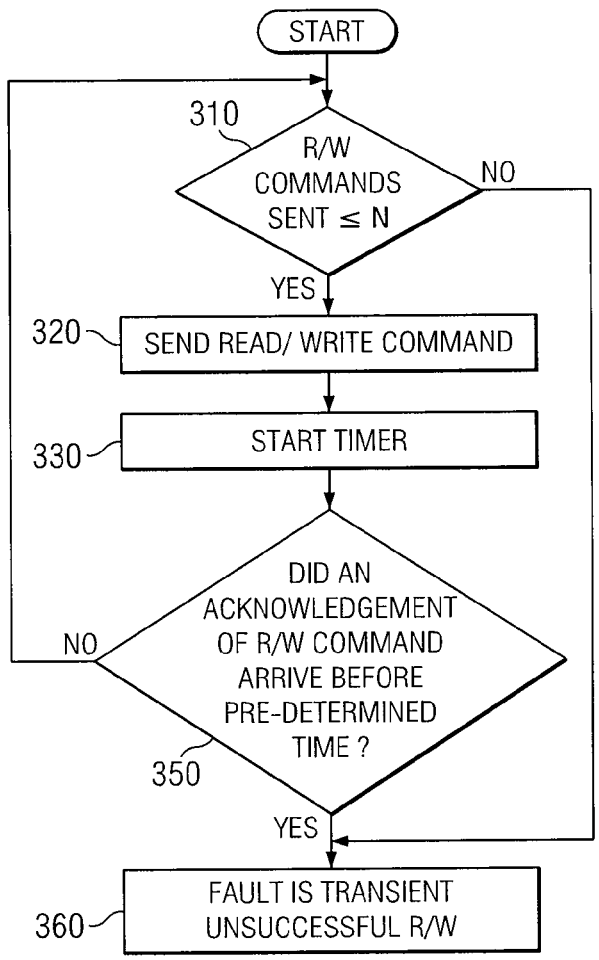
FIG. 4 is a flowchart demonstrating one embodiment of a method for determining a transient fault based on an unsuccessful read/write operation.

FIG. 4 is a flowchart demonstrating one embodiment of a method for determining a transient fault based on an unsuccessful read/write operation. For example, such a method may be performed in particular embodiments in conjunction with step 108 of the method of FIG. 2 (along with other suitable techniques for identifying a transient fault, if applicable).

In some embodiments, a controller card sends a read/write command to the line cards and waits for acknowledgment of the receipt of the command for a period of time. If the controller card does not receive acknowledgement from the line cards within the defined period of time after the command is sent and/or if a particular number of commands have been sent without an acknowledgment being received, an unsuccessful read/write operation has occurred and a transient fault is detected. In some cases, a user may define the period of time and/or the particular number of unacknowledged commands. Any suitable values may be used for the period of time and particular number of unacknowledged commands.

In the illustrated embodiment, the method begins at step 310 where the controller card determines whether the number of unacknowledged read/write commands sent to the line cards is less than or equal to the particular number of unacknowledged commands. When the method first begins, the number of unacknowledged commands will be zero. If the number of unacknowledged read/write commands sent to the line cards is less than or equal to the particular number of commands sent, method continues to step 320. If the number of unacknowledged read/write commands sent to the line cards is more than the particular number of commands sent, the method continues to step 360.

At step 320, the controller card sends a read/write command to the line cards at step 320 and the timer is started at step 330. The controller card waits for an acknowledgment of the received command.

At step 350, the controller card determines whether an acknowledgement of the read/write command from the faulting card arrived before the defined period of time. If the acknowledgment arrived before the defined period of time, method continues to step 360. If not, the method continues to step 310.

At step 360, the controller card determines that an unsuccessful read/write command has occurred and that a transient fault is detected at step 360.

Modifications, additions, or omissions may be made to the method without departing from the scope of the invention. The method may include more, fewer, or other steps. Additionally, steps may be performed in any suitable order without departing from the scope of the invention.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed:

1. A method for automatically attempting to recover equipment from a transient fault, comprising:
   detecting a fault associated with the equipment in a node in a communications network;
   determining whether the fault associated with the equipment is transient by determining that a pre-defined memory space address on the equipment has changed and determining that the fault is a transient power glitch fault based on the change to the memory space address on the equipment;
   if the fault is transient, automatically attempting to recover the equipment from the transient fault without user intervention;
   if the recovery attempt is successful, monitoring the equipment for a pre-determined period of time to determine if the fault recurs; and
   if the fault recurs, automatically re-attempting to recover the equipment from the fault until the fault does not recur in the pre-determined period of time or until a pre-determined number of attempts to recover the equipment have been performed.

2. The method of claim 1, further comprising, if the recovery attempt is successful, reprovisioning the equipment.

3. The method of claim 1, further comprising determining whether the recovery attempt is successful by sending a read/write command to the equipment and receiving an acknowledgment that the read/write command was successful.

4. The method of claim 1, further comprising logging the detected fault on a controller card on the node.

5. The method of claim 1, further comprising notifying the user of the recovery attempt.

6. The method of claim 1, further comprising in response to detecting the fault associated with the equipment, sending a fault alarm.

7. The method of claim 1, further comprising:
   in response to detecting the fault associated with the equipment, sending a fault alarm;
   in response to a recovery attempt, sending a recovery notification; and if the fault does not recur in the pre-determined period of time, clearing the fault alarm and the recovery notification.

8. The method of claim 1, wherein the step of determining whether a fault associated with the equipment is transient comprises:
   determining a cause of the fault; and
   categorizing the fault as transient based on the cause of the fault.

9. The method of claim 1, wherein the step of determining whether a fault associated with the equipment is transient comprises assuming that the fault is transient.

10. The method of claim 1, wherein if the predetermined number of attempts to recover the equipment have been performed, the fault is determined to be permanent and no further recovery attempts are performed.

11. The method of claim 1, wherein if the recovery attempt is unsuccessful, the fault is determined to be permanent and no further recovery attempts are performed.

12. The method of claim 1, wherein determining that the fault associated with the equipment is transient comprises:
   sending read/write commands to the equipment until a pre-determined number of read/write commands have been sent or until receiving an acknowledgement that the read/write command was received by the equipment; and
   determining that the fault is a transient unsuccessful read/write fault if the pre-determined number of read/write commands have been sent without receiving an acknowledgement that the read/write command was received by the equipment.

13. A system for automatically attempting to recover equipment from a transient fault, the system comprising a node having:
   a line card having equipment associated with a fault;
   a controller card coupled to the line card and operable to:
      detect the fault associated with the equipment in the line card;
      determine whether the fault associated with the equipment is transient by determining that a pre-defined memory space address on the equipment has changed and determining that the fault is a transient power glitch fault based on the change to the memory space address on the equipment;
      if the fault is transient, automatically attempt to recover the equipment from the transient fault without user intervention;
      if the recovery attempt is successful, monitor the equipment for a pre-determined period of time to determine if the fault recurs; and
      if the fault recurs, automatically re-attempt to recover the equipment from the fault until the fault does not recur in the pre-determined period of time or until a pre-determined number of attempts to recover the equipment has been performed.

14. The system of claim 13, wherein the controller card is further operable to reprovision the equipment if the recovery attempt is successful.

15. The system of claim 13, wherein the controller card determines whether the recovery attempt is successful by:
   sending a read/write command to the equipment; and
   receiving an acknowledgment that the read/write command was successful.

16. The system of claim 13, wherein the controller card is further operable to log the detected fault.

17. The system of claim 13, wherein the controller card is further operable to notify the user of the recovery attempt.

18. The system of claim 13, wherein the controller card is further operable to send a fault alarm in response to detecting the fault associated with equipment.

19. The system of claim 13, wherein the controller card is further operable to:
   in response to detecting the fault associated with the equipment, send a fault alarm;
   in response to a recovery attempt, send a recovery notification; and
   if the fault does not recur in the pre-determined period of time, clear the fault alarm and the recovery notification.

20. The system of claim 13, wherein the controller card determines whether the fault associated with the equipment is transient by:
   determining a cause of the fault; and
   categorizing the fault as transient based on the cause of the fault.

21. The system of claim 13, wherein the controller card determines whether the fault associated with the equipment is transient by assuming that the fault is transient.

22. The system of claim 13, wherein the controller card is further operable to determine that, if the predetermined number of attempts to recover the equipment have been performed, the fault is permanent and no further recovery attempts are performed.

23. The system of claim 13, wherein the controller card is further operable to determine that, if the recovery attempt is unsuccessful, the fault is permanent and no further recovery attempts are performed.

24. The system of claim 13, wherein the controller card determines that that the fault associated with the equipment is transient by:
   sending read/write commands to the equipment until a pre-determined number of read/write commands have been sent or until receiving an acknowledgement that the read/write command was received by the equipment; and
   determining that the fault is a transient unsuccessful read/write fault if the pre-determined number of read/write commands have been sent without receiving an acknowledgement that the read/write command was received by the equipment.

25. Software for automatically attempting to recover equipment from a transient fault, the software stored on a computer-readable medium and operable to:
   detect a fault associated with the equipment in a node in a communications network;
   determine whether the fault associated with the equipment is transient by determining that a pre-defined memory space address on the equipment has changed and determining that the fault is a transient power glitch fault based on the change to the memory space address on the equipment;
   if the fault is transient, automatically attempt to recover the equipment from the transient fault without user intervention;
   if the recovery attempt is successful, monitor the equipment for a pre-determined period of time to determine if the fault recurs; and
   if the fault recurs, automatically re-attempt to recover the equipment from the fault until the fault does not recur in the pre-determined period of time or until a pre-determined number of attempts to recover the equipment have been performed.

26. The software of claim 25, further operable to, if the recovery attempt is successful, reprovision the equipment.

27. The software of claim 25, further operable to determine whether the recovery attempt is successful by sending a read/write command to the equipment and receiving an acknowledgment that the read/write command was successful.

28. The software of claim 25, further operable to log the detected fault on a controller card on the node.

29. The software of claim 25, further operable to notify the user of the recovery attempt.

30. The software of claim 25, further operable to, in response to detecting the fault associated with the equipment, send a fault alarm.

31. The software of claim 25, further operable to:
   in response to detecting the fault associated with the equipment, send a fault alarm;
   in response to a recovery attempt, send a recovery notification; and
   if the fault does not recur in the pre-determined period of time, clear the fault alarm and the recovery notification.

32. The software of claim 25, wherein to determine whether the fault associated with the equipment is transient, the software is operable to:
   determine a cause of the fault; and
   categorize the fault as transient based on the cause of the fault.

33. The software of claim 25, wherein to determine whether a fault associated with the equipment is transient comprises to assume that the fault is transient.

34. The software of claim 25, wherein if the predetermined number of attempts to recover the equipment has been performed, the software is further operable to determine that the fault is permanent and no further recovery attempts are performed.

35. The software of claim 25, wherein if the recovery attempt is unsuccessful, the software is further operable to determine that the fault is permanent and no further recovery attempts are performed.

36. The software of claim 25, wherein determining that the fault associated with the equipment is transient, the software is further operable to:
   send read/write commands to the equipment until a pre-determined number of read/write commands have been sent or until receiving an acknowledgement that the read/write command was received by the equipment; and
   determine that the fault is a transient unsuccessful read/write fault if the pre-determined number of read/write commands have been sent without receiving an acknowledgement that the read/write command was received by the equipment.

* * * * *